Oct. 26, 1948.     W. L. SHIMMON     2,452,212
VINEYARD PLOW
Filed Jan. 11, 1946

INVENTOR.
W. L. Shimmon
BY
ATTYS

Patented Oct. 26, 1948

2,452,212

UNITED STATES PATENT OFFICE 2,452,212

VINEYARD PLOW

William L. Shimmon, Modesto, Calif.

Application January 11, 1946, Serial No. 640,531

2 Claims. (Cl. 97—137)

This invention relates generally to an improved vineyard plow.

In particular the invention is directed to, and it is an object to provide, a vineyard plow of novel design operative to cultivate the earth between the vines of a vineyard row, yet arranged to automatically swing clear of the trunks of the vines so as to pass the same, and to then return to working position.

Another object of the invention is to provide a vineyard plow, as above, which comprises a plow blade normally disposed in a position to work in a path between the vines of a row but mounted for lateral shifting motion to a position to pass clear of the vine trunks, and a trunk engaging arm leading the plow blade arranged, when engaged and actuated by a trunk, to cause the plow blade to shift laterally to said clearance position.

A further object of this invention is to provide a vineyard plow, of the type described, wherein the lead of the plow blade is altered, when a vine trunk is engaged by the device, so that the plow blade itself does not resist, but rather facilitates, its motion to a trunk clearance position.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
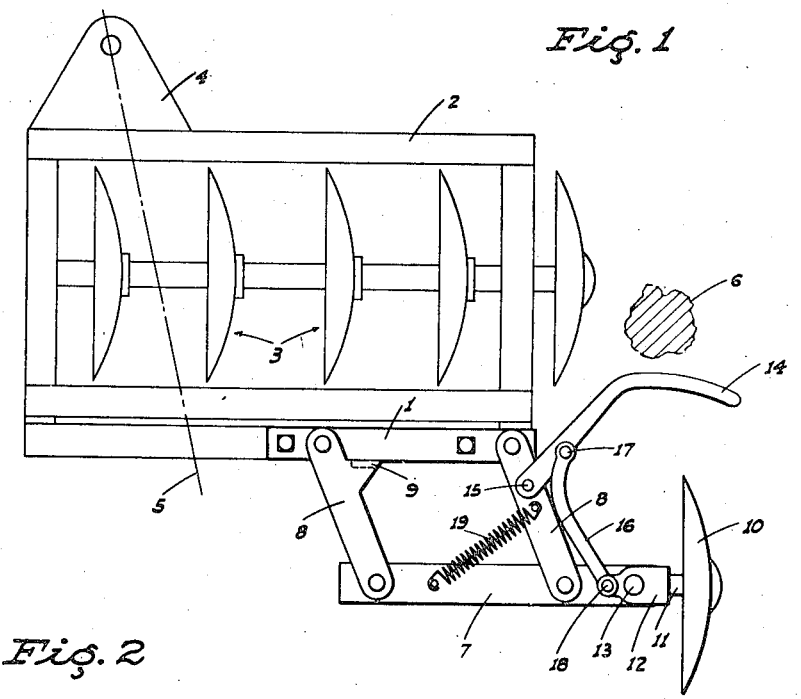
Figure 1 is a plan view of a vineyard plow incorporating the present invention, with the between vine plow blade in normal working position.
Figure 2:
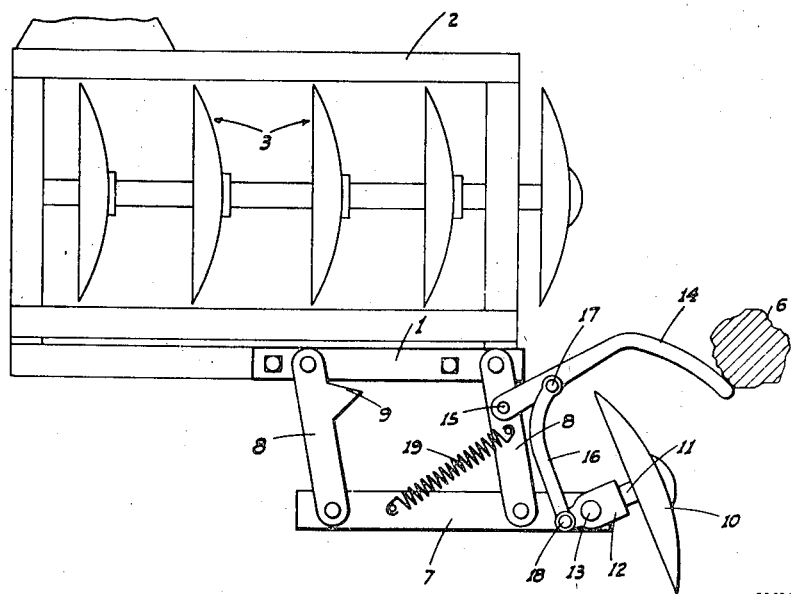
Figure 2 is a similar view but illustrates the between vine plow blade shifted laterally to trunk clearance position.

Referring now more particularly to the characters of reference on the drawings, and particularly at present to Figs. 1 and 2, the implement comprises a transverse front beam 1 adapted to be secured to the rear and adjacent one side of a disc harrow or the like, which includes a frame 2 and a disc gang 3. The disc harrow is of course conventional, and is of a type commonly employed to cultivate between the rows in a vineyard. The disc gang includes a hitch plate 4 adapted for coupling to a tractor, and the line of draft is indicated in Fig. 1 by the broken line 5.

To the rear of its front beam 1, the implement which comprises the present invention, and which is for the purpose of cultivating in a direct path between the trunks 6 of a vineyard row, includes a transverse rear beam 7 disposed in spaced relation to the rear of said front beam 1 in parallel, laterally outwardly offset relation.

The front beam 1 and the transverse rear beam 7 are connected together by pivotally mounted parallel links 8 normally disposed in outwardly diagonal relation, as shown in Fig. 1; the extent of outward swinging movement of said links 8 being limited by a stop 9 on one thereof which abuts against the front beam 1.

When the transverse rear beam 7 is in its normal position, as in Fig. 1, its outer end is disposed some distance laterally out from the corresponding end of the disc gang.

A plow blade here shown in the form of a disc 10, is mounted on a laterally outwardly projecting spindle 11 horizontally swingably secured by a yoke 12 and vertical pivot 13 to the outer end of the transverse rear beam 7.

A trunk engaging arm 14, of somewhat L-shape, is pivoted, as at 15, to the outermost link 8 intermediate its ends, and said arm projects laterally outwardly ahead of the plow blade 10. A thrust link 16 is pivotally connected, at one end, as at 17, to the trunk engaging arm 14 adjacent but outwardly of the pivot 15, while said thrust link 16 is pivotally connected at its other end, as at 18, to the yoke 12 laterally inwardly of the pivot 13 thereof.

A heavy-duty tension spring 19 is connected between the outermost link 8 intermediate its ends and the transverse rear beam 7 at a point between said parallel links 8; such spring normally acting to shift the rear beam 7 to its outermost position of projection, and at which time the plow blade 10 travels in a path a considerable distance laterally outwardly of the adjacent endmost disc of the disc gang 3.

The plow blade 10, in its normal working position, is angularly disposed relative to the line of draft 5, as shown in Fig. 1, and with advance of the disc harrow along a vineyard row said plow blade 10 works in a path, and cultivates between, the vine trunks 6.

As the plow blade 10 approaches one of said vine trunks 6, the arm 17 first engages such trunk, and with continued advance of the implement is swung rearwardly. This results in the parallel links 8 being swung laterally inwardly from the position shown in Fig. 1 to the position shown in Fig. 2. As a consequence the plow blade 10 is shifted from its normal working position in a path directly between the trunks to a position to pass, without striking, the trunk engaged by the arm 14. At the same time that the links 8 are swung laterally inwardly by the trunk engaging arm 14, the thrust link 16 swings the yoke 12 rearwardly at its inner end, causing the lead of the plow blade 10 to change from its normal angular relation to the line of draft 5 to a position substantially parallel therewith, as illustrated in Fig. 2. This is advantageous for the reason that as so shifted the plow blade facilitates, rather than resists, movement thereof to its trunk clearance position.

The present invention provides a practical and efficient means of cultivating in a path directly between the trunks of a vineyard row without the necessity of manual control of the plow to cause its passage in clearance relation around each trunk; this operation being accomplished automatically.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A vineyard plow comprising front and rear frame members in spaced parallel relation, the front frame member being adapted to be supported above ground for movement along a vineyard row, longitudinally extending parallel links pivotally connecting the frame members, the rear frame member projecting at one end laterally outward beyond the corresponding end of the front frame member, a plow blade disposed outward of said projecting end of the rear frame member, a plow blade supporting element pivoted intermediate its ends on said projecting end of the rear frame beam for horizontal swinging motion, a trunk engaging arm pivoted at its inner end to the outermost link and projecting laterally outward ahead of the plow blade, and a thrust link pivotally connected between said arm intermediate its ends and said plow blade supporting element inwardly of the pivot of the latter.

2. A vineyard plow comprising front and rear frame members in spaced parallel relation, the front frame member being adapted to be supported above ground for movement along a vineyard row, longitudinally extending parallel links pivotally connecting the frame members, the rear frame member projecting at one end laterally outward beyond the corresponding end of the front frame member, a plow blade disposed outward of said projecting end of the rear frame member, a plow blade supporting element pivoted intermediate its ends on said projecting end of the rear frame beam for horizontal swinging motion, a trunk engaging arm pivoted at its inner end to the outermost link and projecting laterally outward ahead of the plow blade, and a thrust link pivotally connected between said arm intermediate its ends and said plow blade supporting element inwardly of the pivot of the latter; there being a tension spring connected diagonally between the rear frame member between the links, and the outermost one of the latter intermediate its ends, and a stop arranged to limit outward projection of said rear frame member.

WILLIAM L. SHIMMON.

REFERENCES CITED

The following references are of record in the file of this patent:

UNITED STATES PATENTS

| Number | Name | Date |
|---|---|---|
| 1,710,232 | Martin | Apr. 23, 1929 |
| 2,185,634 | Jacobs et al. | Jan. 2, 1940 |

FOREIGN PATENTS

| Number | Country | Date |
|---|---|---|
| 428,937 | France | July 3, 1911 |
| 443,272 | France | July 10, 1912 |
| 615,548 | France | Oct. 12, 1926 |